No. 872,412. PATENTED DEC. 3, 1907.
J. C. W. GRETH.
WATER PURIFYING APPARATUS.
APPLICATION FILED NOV. 27, 1906.
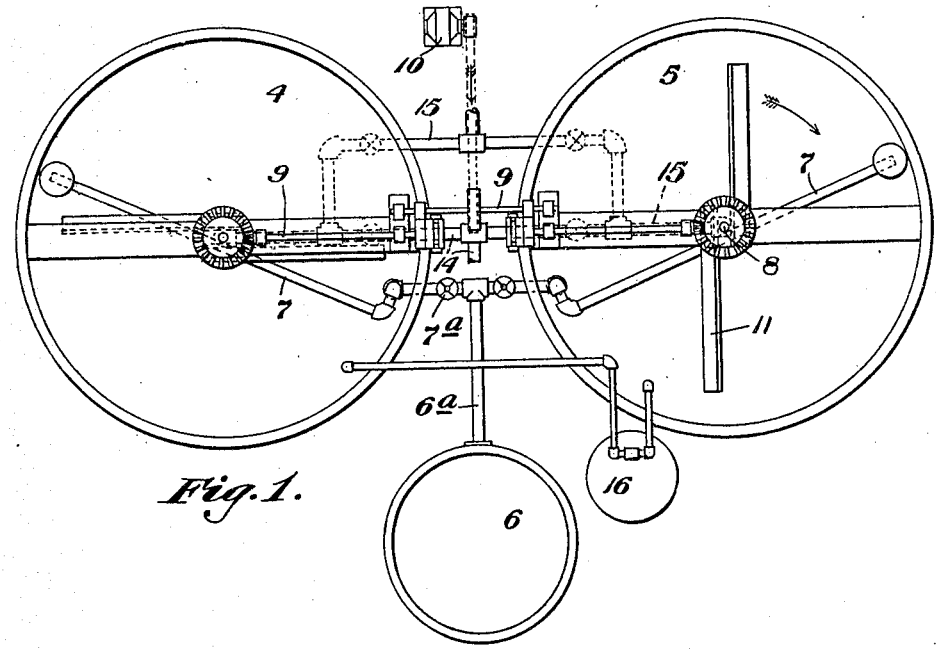
Fig. 1.
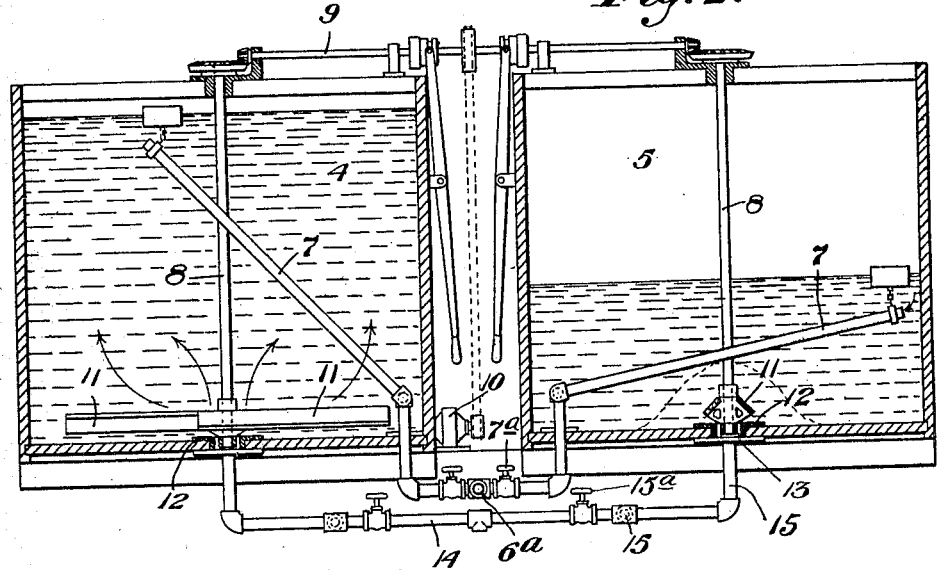
Fig. 2.
Fig. 3.
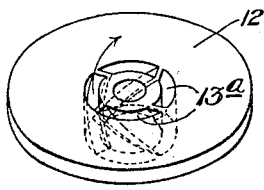
Witnesses
Chas. S. Lepley.
E. R. Rodd.
Inventor,
John C. W. Greth
By F. W. H. Clay, atty.

UNITED STATES PATENT OFFICE.

JOHN C. W. GRETH, OF PITTSBURG, PENNSYLVANIA, ASSIGNOR TO THE WM. B. SCAIFE & SONS COMPANY, OF PITTSBURG, PENNSYLVANIA, A CORPORATION OF NEW JERSEY.

WATER-PURIFYING APPARATUS.

No. 872,412.  Specification of Letters Patent.  Patented Dec. 3, 1907.

Application filed November 27, 1906. Serial No. 345,409.

*To all whom it may concern:*

Be it known that I, JOHN C. W. GRETH, a citizen of the United States, residing at Pittsburg, in the State of Pennsylvania, have invented certain new and useful Improvements in Water-Purifying Apparatus, of which the following is a specification.

My invention relates to apparatus for filling, treating and emptying the water in the re-action tanks of water purifying apparatus, and especially to the intermittent systems. Its primary objects are to provide for so introducing the water into the reaction tank as to stir up the sediment from the bottom and to properly manipulate the currents so as to facilitate the precipitation of impurities; to combine a convection current stirring with a mechanical stirring device; to provide for efficient cleaning of the tank, and to generally improve the operation of water purifying apparatus in these directions.

In the accompanying drawing I have shown an example of twin tank apparatus involving one form of my invention.

Figure 1 is a plan view, and Fig. 2 is a vertical section through the principal tanks and side elevation of the piping, etc. Fig. 3 is a perspective view of an alternative form of the outlet plate for the tank.

In apparatus of the kind illustrated there are provided a plurality of treatment tanks such as 4, 5, in which the raw water and the chemical are brought together and thoroughly commingled and stirred, after which the water is allowed to settle and is then drawn off to a filter 6 by means of floating outlet pipes 7. The chemical, such as soda solution may be introduced in any convenient way from the receptacle 16 by piping as shown in Fig. 1. In each of the treatment tanks I provide a vertical shaft 8 which is driven by suitable gearing 9 from a motor 10 and on each of the shafts is a series of paddles 11 which are made with inclined blades so that they tend to throw the water both upward and outward from the center. The lower end of the shaft 8 is surrounded by a plate 12 which has close to the paddles openings 13 to a pipe 15 and this pipe may be connected with the sewer 14 to wash out the tank and is also connected to the supply pipe or inlet of the water. Thus the water to be treated is introduced into the bottom of the tank through the pipe 15 and the openings 13 directly under the paddles 11. By this means I dissipate the sediment which tends to collect around the center of the shaft 8 and carry it upward and outward through the body of water, it being well understood that such precipitates aid in the action of the chemical and further causing the impurities to coagulate and separate out of the water. This device thus greatly facilitates the chemical action and at the same time insures very thorough mixing. The paddles are active at the outer periphery, but move so much slower at the center that the chemical tends to collect at that point and would not be well mixed by the paddles, but are stirred and mixed by the incoming current which is active at this point.

When it is desired to clean the re-action tanks it will be found that the detritus has collected near the center of the tank, owing to the swirl of the water, especially after the paddles have been stopped, and by having the outlet opening at the center the sludge may be readily drawn out. Since the washing water is applied at exactly the place where the sludge is collected a very much less quantity of water than usual is required to wash out the tank, while the paddles may be put in action to collect all the sludge over the outlet. The arrangement of the valves $15^a$ and $7^a$ is such as to allow the ready manipulation of the incoming and outcoming water.

As an additional means of properly directing the currents of water as they enter the tank, I may use the bottom plate $12^a$ as illustrated in Fig. 3. It has its openings $13^a$ provided in a helical form as shown so that the incoming water is given a swirling motion which tends to carry out the sludge in the proper direction and may be used also to direct the current in a direction opposite to the tendency of the paddles to set up circular currents. This is very important as it will thoroughly prevent the accumulation of sludge near the center of the tank while the paddles are moving. On the other hand in cleaning the tank the form of this outlet will cause circular currents in the water and thereby more efficiently draw the sludge up to the place of outlet. The various advantages of these devices will be readily apparent to those familiar with the art.

Having thus described my invention and illustrated its use, what I claim as new and desire to secure by Letters Patent is the following.

1. In intermittent water purifying apparatus, the combination of two flat bottom tanks each having a rotary stirring paddle therein adapted to throw water either upward or downward, and a common inlet pipe having branches opening into the bottoms of each tank directly at the center and immediately under the plane of movement of said paddles, said inlets being adapted to create vertical currents at the center of motion of the paddles, where the circular motion due to the paddles is least, and said inlet pipe being provided with means for using it as an outlet to withdraw sludge and having valves by which it may be connected with each of said tanks in alternation.

2. The combination of a flat bottom circular tank, a stirring device revolving therein having inclined paddles close to the bottom, and an inlet for the water adapted to inject the same or to withdraw water directly at the center of motion of the paddles, whereby to stir the water in vertical currents at the point where the revolving paddle action is least.

3. In a treatment vessel the combination with a stirring device adapted to create circular currents in one direction, of an inlet for the water having a means to create currents in the opposite direction, substantially as described.

4. In water purifying apparatus a re-action tank having a mechanical stirring device, and an inlet for the water placed under the stirrer and arranged to throw any collected precipitates spirally into the path of the moving parts of the stirrer, substantially as described.

5. In water purifying apparatus a re-action tank and an outlet therefor having means to create circular currents in the tank as the water flows in or out, substantially as described.

6. In a water purifying apparatus a tank having openings in its bottom for inlet of the water and outlet of the sludge, and means in said openings to create circular currents in the water when flowing in either direction, substantially as described.

In testimony whereof I have hereunto signed my name in the presence of the two subscribed witnesses.

JOHN C. W. GRETH.

Witnesses:
F. W. H. CLAY,
CHAS. S. LEPLEY.